Nov. 24, 1931.  R. J. LUSSE  1,833,844
AMUSEMENT VEHICLE
Filed Dec. 22, 1928   3 Sheets-Sheet 1

Inventor:-
Robert J. Lusse
by his Attorneys
Howson & Howson

Nov. 24, 1931.  R. J. LUSSE  1,833,844
AMUSEMENT VEHICLE
Filed Dec. 22, 1928   3 Sheets-Sheet 2
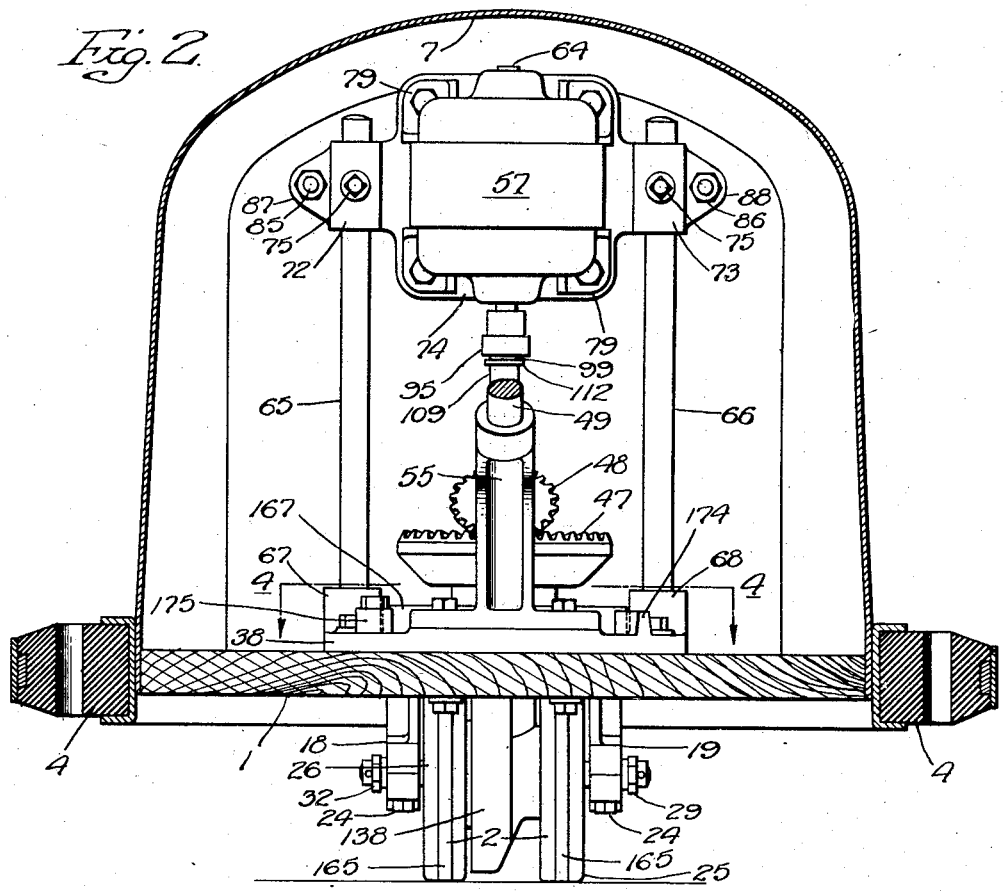
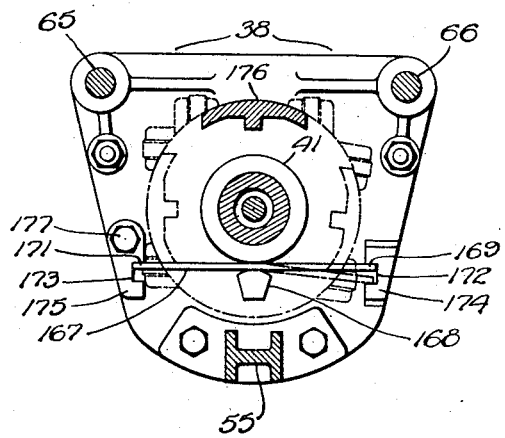
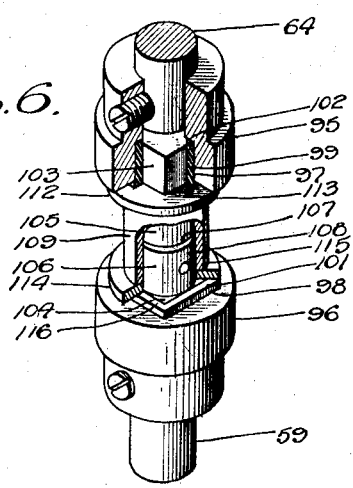
Inventor:-
Robert J. Lusse
by his Attorneys.

Nov. 24, 1931.  R. J. LUSSE  1,833,844
AMUSEMENT VEHICLE
Filed Dec. 22, 1928   3 Sheets-Sheet 3
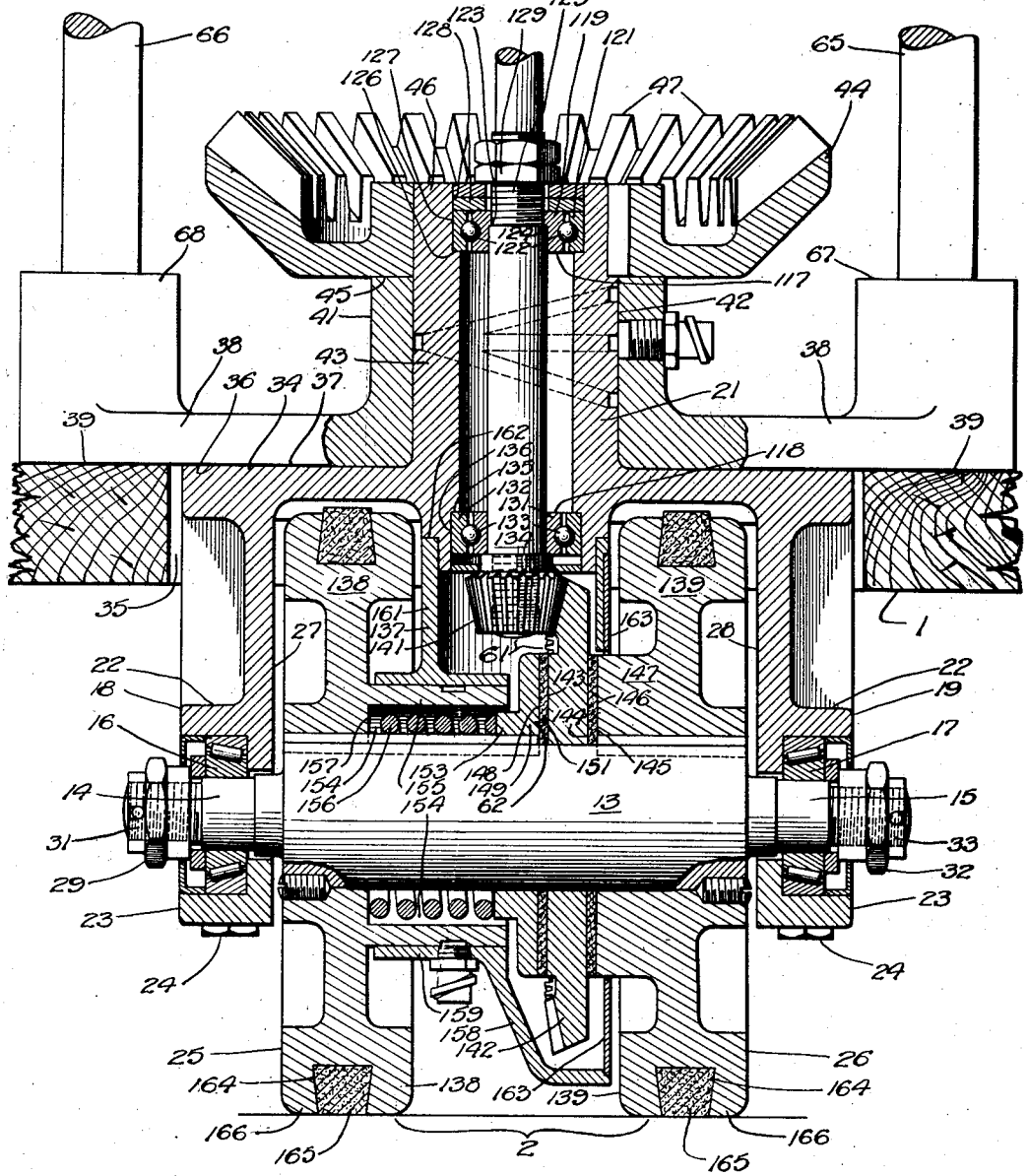
Fig. 3.
Fig. 5.
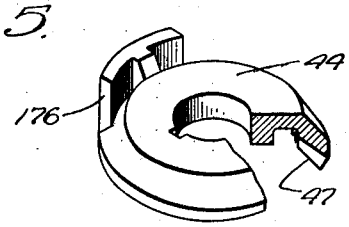
Inventor:-
Robert J. Lusse
by his Attorneys.
Howson & Howson Patented Nov. 24, 1931

1,833,844

UNITED STATES PATENT OFFICE

ROBERT J. LUSSE, OF PHILADELPHIA, PENNSYLVANIA, ASSIGNOR TO LUSSE BROTHERS, INC., OF PHILADELPHIA, PENNSYLVANIA, A CORPORATION OF PENNSYLVANIA

AMUSEMENT VEHICLE

Application filed December 22, 1928. Serial No. 327,927.

My invention relates to vehicles, having particular relation to such vehicles as are adapted for use in amusement parks.

In its broad aspect, one object of my invention is to provide simple, efficient and compact propelling means for a car of the character described.

Another object of my invention is to provide a vehicle which is particularly characterized by its ease of control, permitting the operator to steer the car in a forward, side or reverse direction.

Still another object of my invention is to provide a vehicle, wherein a steering wheel, which is positioned at the front end thereof, is power driven, so that the vehicle may be propelled from the front end, rather than the rear end.

A further object of my invention is to provide, in apparatus of the character described, a steering wheel, in combination with means whereby a movement of the steering wheel into a reversing position may be resiliently retarded.

A still further object of my invention is to provide means, whereby a suitable traction effect may be maintained between the steering wheel and the floor surface, with a minimum weight on the steering wheel.

A still further object of my invention is to provide power-operating means for a steering wheel, wherein a driving shaft is provided with a clutch connection to the steering wheel.

A still further object of my invention is to provide an amusement vehicle comprising a steering wheel, and power-operating means therefor provided with an adjustably mounted motor.

A still further object of my invention is to provide apparatus of the class described, comprising power-operating means for a steering wheel, the operating means including flexible coupling means.

With these and other objects and applications in mind, my invention further consists in the details of construction and operation and arrangement, hereinafter described and claimed and illustrated in the accompanying drawings, wherein Fig. 1 is a longitudinal, sectional view of an amusement vehicle embodying my invention;

Fig. 2 is an enlarged, transverse sectional view through the front end of the car, looking in the direction of the power-driving apparatus for the steering wheel, the sectional plane being taken on the line 2—2 of Fig. 1;

Fig. 3 is a still further enlarged vertical sectional view taken on the line 3—3 of Fig. 1, showing the detail structure of the steering wheel and the supporting and driving parts immediately associated therewith;

Fig. 4 is a detail, horizontal sectional view taken on the line 4—4 of Fig. 2, illustrating the resilient abutment tending to prevent a movement of the steering wheel into a reversing position;

Fig. 5 is an inverted perspective view of the driven gear-wheel for the steering wheel, with its spring-abutting shoulder shown in Fig. 4;

Fig. 6 is an enlarged perspective view, partially in section of the coupling means for associating the motor shaft and the driven shaft which is clutch connected to the steering wheel.

Figures 1, 7:
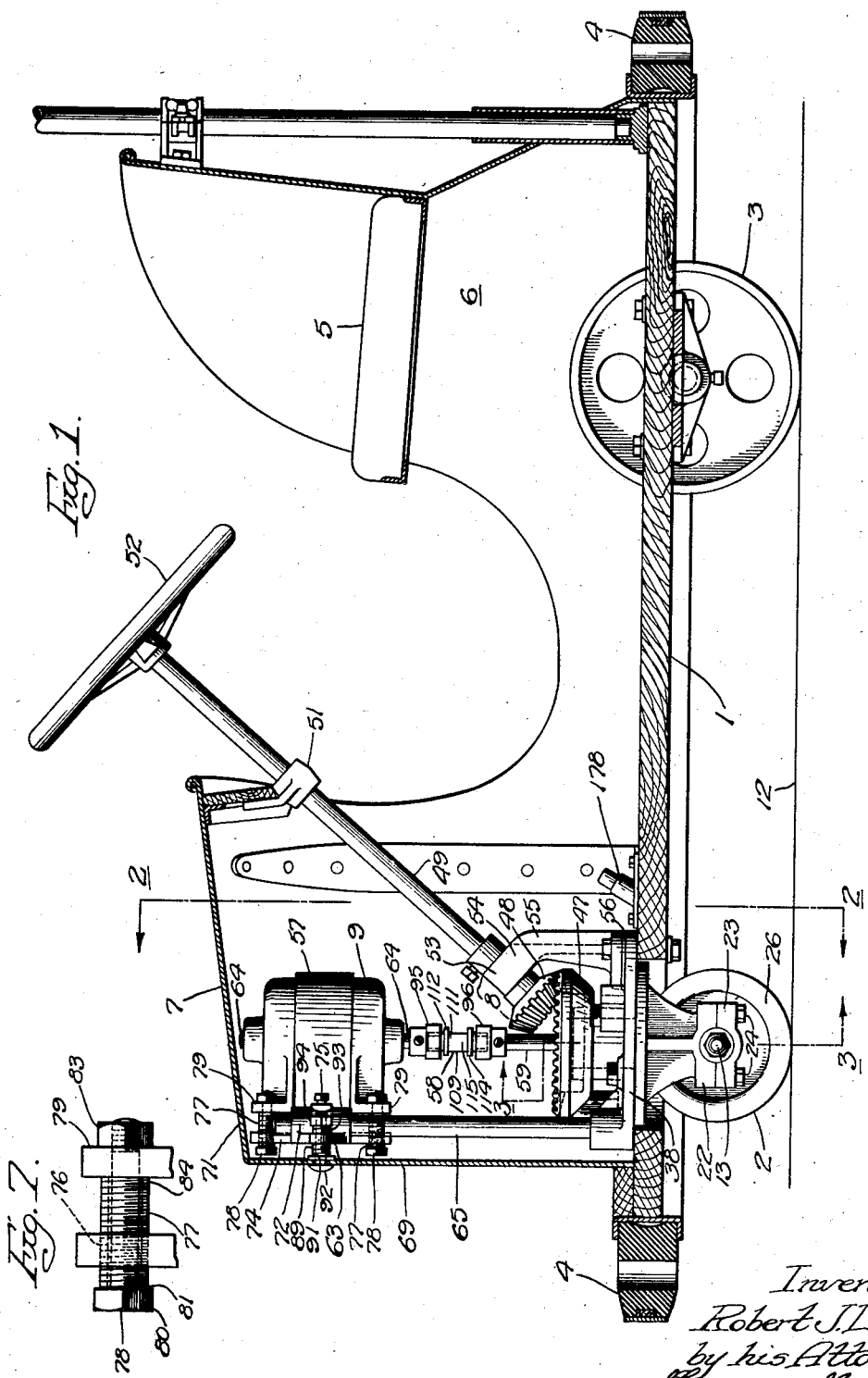
Fig. 7 is an enlarged detail view of one of the adjustable supporting sleeves for the driving motor with its clamping bolt.

Referring to Fig. 1, the amusement vehicle or car therein shown comprises broadly a main horizontal platform 1, which is movably mounted in the front end on a steering wheel 2 and at the rear end on a pair of non-swiveling, spaced supporting wheels 3 positioned at the sides of the platform 1; a shock-absorbing bumper 4 constituting the subject matter of my prior United States Letters Patent No. 1,754,112, dated April 8, 1930, and assigned to Lusse Brothers, Inc.; a seat 5 supported by a structure 6 on the rear end of the platform 1; a hood 7 mounted on the front end of the platform 1; steering means 8, which includes the swiveling wheel 2, for controlling the direction of movement of the car; and power-operating means 9, whereby the car may be propelled.

The steering means 8 includes the steering wheel 2 (Fig. 3) which is movable over a floor surface 12. The wheel 2 is mounted on a horizontal shaft 13, opposite end portions 14 and 15 of which are journaled in bearings 16 and 17 respectively mounted in arms 18 and 19 of a U-shaped supporting member 21. Each of the bearings comprises an upper portion 22 and a lower portion 23, these portions being secured together by bolts 24, so that the steering wheel 2 and the shaft 13 may be removed as a unit when the lower bearing portions 23 are released by the unscrewing of the bolt 24.

Opposite sides 25 and 26 of the steering wheel 2 are positioned between inner sides 27 and 28 of the depending arms 18 and 19, respectively, of the supporting member 21. As shown in Fig. 3, the adjacent sides 25, 27 and 26, 28 are in spaced relation, permitting a slight axial movement of the steering wheel 2 relative to the supporting member 21, for reasons as will presently appear in greater detail. Such relative movement may be caused by tightening a nut 29 on the threaded end portion 31 of the shaft 13 extending beyond the bearing 16, and by correspondingly loosening a nut 32 mounted on a threaded end portion 33 of the shaft 13 extending beyond the opposite bearing 17. In this manner, the steering wheel 2 may be moved to the right, as viewed in Fig. 3. Should it be desirable to move the steering wheel 2 to the left, then it is necessary only to loosen the nut 29 and correspondingly tighten the nut 31.

A base portion 34 of the U-shaped supporting member 21 is positioned in an aperture 35 formed in the front end of the car platform 1, and it is provided with a flat upper side 36 which seats against a similar lower side 37 of a base plate 38 bolted or otherwise secured on an upper side 39 of the platform 1, as shown in Figs. 1 and 3. The base plate 38 is formed with a centrally-positioned, upwardly-extending hub 41 constituting a bearing, a central opening 42 of which is adapted to receive an upright tubular portion 43 of the U-shaped member 21. The supporting member 21 thus receives the weight of the front end of the car on its flat bearing surface 36 and, at the same time, is journaled for rotative movement only in the bearing afforded by the hub 41.

A member 44 of cup shape is slidably mounted on an upper edge 45 of the hub 41, and it is keyed to an end portion 46 of the tubular portion 43 positioned beyond the upper edge 45. An inner side of the member 44 is provided with a plurality of teeth forming a bevel gear-wheel 47, which co-acts with a driving pinion 48. The pinion 48 is mounted on a lower end of a steering post section 49, an upper end of which extends through a bearing 51 carried by the upper side portion of the hood 7 and terminates in a steering member 52 positioned immediately adjacent to the seat 5, so as to be accessible to the operator. The lower end of the steering post section 49 is supported in a bearing 53 carried on a bent portion 54 of an upright arm 55 secured to a rear portion 56 of the base plate 38.

Hence, when the steering member 52 is turned, the pinion 48 moves the bevel gear-wheel 47, the latter, by reason of its connection to the tubular portion 43, causing the turning of the supporting member 21 and the steering wheel 2 about a vertical axis. The dotted-line position of Fig. 4 illustrates the position of the steering wheel 2 when it is desired to move the car in a forward direction. The position of the steering wheel 2 following a 90° movement from the mid-position is illustrated in dot-and-dash lines, while the position of the steering wheel 2 for a movement from the mid-position in the opposite direction greater than 90° is shown by dash-lines.

One of the important features of the present invention is the provision of the power-operating means 9 for the car at the front end thereof directly under the hood 7, as shown in Fig. 1, said power means being so connected to the steering wheel 2 that the latter may be operated independently of the steering member 52 to cause the propulsion of the car. To this end, I provide, broadly, an adjustably-mounted motor 57 (Fig. 1) and power-transmitting means comprising a flexible coupling member 58 (Fig. 6), a shaft 59, gear-wheel mechanism 61 and a spring-loaded clutch 62, permitting the occurrence of slippage between the steering wheel 2 and the power-transmitting means when the load exceeds a predetermined safe value, as occurs, for example, when the car is stalled.

In accordance with my invention, the stationary motor 57 is so mounted on a supporting structure 63 (Figs. 1 and 2) that a driving shaft 64 is in approximately a vertical position and is in substantial alignment with the shaft 59. The supporting structure 63 comprises a pair of spaced upright rods 65 and 66, the lower ends of which are respectively secured in bosses 67 and 68 on the upper side of the base plate 38. The supporting rods 65 and 66 are also spaced forwardly of a vertical front end wall 69 of the hood 7, as shown in Fig. 1 and terminate just below an upper top portion 71 of the hood 7. The rods 65 and 66 pass through tubular portions 72 and 73 of a supporting plate 74. Each of these tubular portions are provided with a set screw 75, whereby the supporting plate 74 may be secured in a desired vertical position.

The supporting plate 74 is also provided with a plurality of threaded apertures 76 for exteriorly threaded tubular members 77 (Figs. 1 and 7). A bolt 78 extends through each of the tubular members 77, the supporting plate 74 and a flange 79 of the motor 57. A front head 80 of each of the bolts 78 engages at front end 81 of the adjacent tubular members 77, while an opposite bolt end 82 is provided with a nut 83, whereby the motor flange 79 may be clamped between a remaining end 84 of the tubular members 77 and the nut 83. When it is desired to adjust the position of the motor 57 laterally with respect to the coupling means 58 and shaft 59, each of the nuts 83 is loosened and the tubular members 77 are then turned in so as to increase or decrease the spacing between the outer end 84 of the tubular members 77 and the supporting plate 74. Thus, the position of the motor 57 may be adjusted laterally without disturbing the vertical position thereof. Should it be necessary to replace the motor 57 by another motor having different dimensions, then the vertical adjustment thereof may be readily accomplished, without disturbing the lateral adjustment, merely by moving the supporting plate 74 vertically on the rods 65, 66 and then tightening the set screws 75 when the desired vertical position for the motor has been reached.

As shown in Figs. 1 and 2, the upper end of the rods 65 and 66 may be braced by means of locking devices 85 and 86 which extend between end flanges 87 and 88 of the supporting plate 74 and the front end wall 69 of the hood 7. Each of these locking devices comprises a sleeve 89 which is secured in threaded engagement with one of the shoulders 87, 88 and extended therefrom to a washer 91 positioned in abutting relation with an inner side of the hood end wall 69. A bolt 92 extends through the end wall 69, the washer 91, the adjustable sleeve 89 and one of the shoulders 87, 88 and terminates in a threaded end portion 93 for a clamping nut 94. When it is desired to securely lock the supporting plate 74 in position, following the mounting of the motor 57 thereon and the vertical adjustment thereof to a desired position, the threaded members 89 are so turned as to extend from the supporting shoulders 87 and 88 to the washers 91. The bolts 92 are then passed through the end wall 69 of the housing 7 and the sleeves 89, and the nuts 94 are next positioned on the free ends thereof. The whole is finally securely locked in position by turning the clamping nuts 94, so that the sleeves 89 may be tightly secured between the shoulders 87 and 88 and the end wall 69.

The flexible coupling means 58 (Figs. 1 and 6) comprises a pair of members 95 and 96, which are secured to the adjacent ends of the motor shaft 64 and the drive shaft 59 and are provided with enlarged sockets 97 and 98 of rectangular cross-section. Linings 99 and 101 of rubber or other resilient material are positioned in the sockets 97 and 98, respectively, as shown in Fig. 6, and seat against shoulders 102 at the inner ends thereof. These linings are adapted to receive rectangular end portions 103 and 104 of a pair of steel members 105 and 106, respectively, outer end portions 107 and 108 of which are interconnected by a sleeve 109 keyed or otherwise thereto.

An upper edge 111 of the sleeve 109 abuts against a washer 112, securing the latter in engagement with an outer edge 113 of the rubber lining 99 and preventing an outward movement thereof. A similar washer 114 is positioned between a lower edge 115 of the sleeve 109 and an edge 116 of the rubber lining 101 so as to prevent an upward movement of the latter. As illustrated in Fig. 6, an inward movement of these linings is prevented by the shoulders 102. The rubber linings 99 and 101 thus permit a slight disalignment of the motor shaft 64 and the gear shaft 59 without an increase in the side bearing pressure of these shafts. In addition, such flexible connection prevents an undesirable vibration of the parts of the coupling.

The shaft 59 (Fig. 3), which is connected to the motor shaft 64 through the flexible coupling 58, extends through the center of the upright tubular portion 43 and is journaled in the axis thereof by means of a pair of spaced anti-friction devices 117 and 118. The anti-friction device 117 comprises concentric inner and outer rings 119 and 121 and a plurality of anti-friction elements 122 positioned therebetween. The inner ring 119 is provided with a shoulder 123 which is supported on a shoulder 124 formed by a threaded-shaft portion 125 of reduced diameter. The outer ring 121 is supported on a shoulder 126 formed by enlarging an upper portion 127 of the opening in the tubular portion 43. Washers 128 are mounted on the upper side of the rings 119 and 121 and a nut 129 carried by the threaded portion 125 engages the same. In this way, the portion of the shaft 59 adjacent to the bevel gear-wheel 47 is supported in desired vertical position and prevented from undesirable lateral movement.

The lower end of the anti-friction device 118, similarly comprises a pair of inner and outer rings 131 and 132 and interposed anti-friction elements 133. The inner ring 131 is rigidly secured to a lower end portion 134 of the shaft 59, while the outer end 132 is forced against a shoulder 135 formed by enlarging a lower portion 136 of the opening in the tubular portion 43 of the supporting member 21. Hence, the lower end portion 134 of the vertical driving shaft 59 is afforded a rotatable mounting in the axis of the tubular portion 43 and prevented from undesirable lateral movement. The passage of grease out of the chamber, which is formed between the anti-friction devices 117 and 118, is prevented by a closure plate 137.

In accordance with my invention, the steering wheel 2 comprises a pair of sections 138 and 139 which are spaced to receive therebetween the gear-wheel mechanism 61 and the clutch 62. The gear-wheel mechanism 61 comprises a pinion 141 which is mounted on a lower end portion of the shaft 59 extending beyond the anti-friction supporting means 118. The bevel gear-wheel 141 meshes with a bevel gear-wheel 142 which is loosely mounted on the shaft 13 between the steering-wheel sections 138 and 139. Opposite side portions 143 and 144 of the gear-wheel 142 inwardly of the teeth thereof are substantially flat constituting clutch faces. The clutch face 144 engages a friction washer 145 which abuts against a clutch face 146 formed on an inner end of a hub 147 of the steering-wheel section 139. Between the clutch face 143 and a clutch face 148 of a bearing plate 149 is positioned a friction washer 151. The bearing plate 149 has a splined connection 152 to the shaft 13.

A central hub portion 153 of the bearing plate 149 extends within a recess 154 formed between an axially elongated flange or hub portion 155 of a steering-wheel section 138 and the shaft 13. A spring 156 is positioned within this recess and engages at one end a wall 157 of the wheel section 138 and at the other end the hub portion 153 of the bearing plate 149. The force of the spring 156 is such that the parts of the clutch 62 just mentioned transmit sufficient power from the driving motor 57 to the wheel sections 138 and 139 to start the car with two passengers. Should the car be subjected, however, to a greater load, as when in engagement with another car, the spring 156 is so designed as to permit slippage to occur in the clutch 62. Such slippage permits the continued operation of the motor 57 without over-loading the same.

The gearing 61, as well as the clutch 62, in my invention are enclosed by means of a casing or housing 158 comprising a tubular portion 159 which rotatably engages the flange portion 155 of the wheel section 138. Rotation of the casing 159 with the driving wheel sections 138 and 139 is prevented by means of a casing portion 161 which fits in a recess 162 formed in the lower end portion of the tubular portion 43 immediately adjacent to the anti-friction device 118. An open side of the casing 158 adjacent to the wheel section 139 is closed by means of an end plate 163, as shown in Fig. 3. In this manner, the gear-wheel mechanism 61 and the clutch 62 are completely enclosed, so that the housing 158 may be filled with lubricating material.

A further feature of my invention is the provision of each of the wheel sections 138, 139 with a circular groove 164 in the periphery thereof. This groove is filled with an expansible packing 165 which always tends to extend beyond a floor-engaging surface 166 of the wheel section regardless of the amount of wear of the packing 165. In this manner, good frictional contact is maintained between the steering-wheel sections 138 and 139 and the floor surface 12 with a minimum vertical load thereon.

A still further feature of my invention is the provision of means for resiliently retarding the movement of the power-driven steering wheel 2 upon the actuation thereof into a reversing position, as shown in dash-lines in Fig. 4. To this end, I provide a spring strip 167 which is mounted on the upper side of the base plate 38 between the portion 41 and a stop 168. Opposite ends 169 and 171 extend into recesses 172 and 173 formed in a pair of stationary members 174 and 175, respectively. The arms 169 and 171 are positioned in the path of travel of a shoulder 176 (Fig. 5) extending downwardly from the gear-wheel 47. The parts are so disposed that the shoulder 176 engages the arm 171 when the steering wheel 2 has been moved through a 90° angle from the dotted-line position in Fig. 4 to the dot-and-dash line position. Similarly, the arm 169 is so positioned as to be engaged by the shoulder 176 when the steering wheel 2 has been moved in the opposite direction through a 90° angle from the mid-position shown in Fig. 4.

Should the movement of the steering wheel 2 be continued into the dash-line position, the resilient arm 169 is bent into the dot-and-dash line position, the extent of the movement being limited by the dimensions of the recess 172. Since the steering wheel 1 is now in a position more than 90° from its mid-position, the car is immediately propelled rearwardly. Such operation is of considerable importance in the event that the car is in contact with another car, a bumper rail or other obstruction preventing a forward or side movement. Similarly, the length of the other recess 173 is sufficient to permit a limited movement of the shoulder 176 and hence the steering wheel 2 beyond the dot-and-dash line position shown in Fig. 4. Hence, a rearward movement of the car may be effected when the steering wheel 2 is moved in either direction from the mid-position through an angle slightly greater than 90°, the additional movement necessary to reverse the direction of propulsion of the car being retarded by the force of one of the spring arms 169, 171. The member 175 is pivotally secured to the base plate 38 by means of a bolt 177, so that when the spring 167 is to be removed, it is necessary only to loosen the bolt 177 and turn the member 175 away from the spring 167.

In operation, assuming the steering wheel 2 in the mid-position shown in Fig. 1, when an operator closes a foot-control switch 178 for the motor 57, which is positioned on the car platform 1 just to the rear of the base plate 38, the stationary motors 57 is energized, causing the turning of the vertical shaft 64 thereof. The rotation of the shaft 64 through the flexible coupling 58 causes the movement of the gear shaft 59, while the shaft 59 through the clutch 62 causes the rotation of the wheel sections 138 and 139, as well as the supporting shaft 13, about a horizontal axis. The rotative movement of the wheel sections 138 and 139 thus causes the propulsion of the car and since the steering wheel 2 is in the mid-position, the car moves forwardly in a straight direction. In the event that the car is to be turned, the operator merely moves the steering wheel 2 in the proper direction. Such movement, through the shaft 49 and coacting gear wheels 47, 48 and the U-shaped supporting member 21 causes the turning of the sections 138 and 139 of the steering wheel 2 about a vertical axis and the car proceeds in the new direction.

If the further movement of the car to the front and the side should be blocked by another car, a bumper rail or the like, a reverse movement of the car is obtained without reversing the direction of rotation of the motor 57 merely by so turning the steering member 52 that the shoulder 176 bears against and bends rearwardly one of the arms 169, 171 of the spring 167. When the car is to be stopped, the foot operated push-button switch 178 is released.

In the event that a larger gear-wheel 141 is to be used, the lower halves of the bearings 16 and 17 are released by unscrewing the bolts 24 and the wheel 2 together when the clutch 62 is withdrawn as a unit, whereupon the new gear-wheel is mounted on the lower end of the shaft 59. When the steering wheel 2 is again placed in position between the arms 18 and 19 of the U-shaped supporting member 21, it is necessary to adjust the steering wheel 2 slightly to the right, as viewed in Fig. 3, in order that the gear-wheel 142 may properly mesh with the new gear-wheel. This may be readily done by releasing the nut 32 and tightening the opposite nut 29.

While I have shown only one embodiment of my invention, for the purpose of describing the same and illustrating its principles of construction and operation and arrangement, it is apparent that various changes and modifications may be made therein, without departing from the spirit of my invention. I desire, therefore, that only such limitations shall be imposed thereon, as are indicated in the appended claim or as are demanded by the prior art.

I claim:

An amusement car comprising a horizontal platform, a seat disposed above said platform adjacent the rear end thereof, rear wheels disposed below said seat at opposite sides of said platform in such relation to said seat as to support the weight of occupants of the seat substantially in balance, a traction-steering wheel disposed adjacent the front end of said platform, a carrier for said steering wheel provided with a bearing plate disposed substantially in the plane of said platform, laterally spaced bearings on and depending from said carrier plate between which said steering wheel is mounted, a horizontal shaft carried by said bearings and extending axially through said steering wheel for rotatably supporting said steering wheel in said carrier, a fixed bearing plate rigidly secured to said platform and bearing on said carrier bearing plate, a vertically extending bearing on said rigid bearing plate, a shank extending vertically from said carrier bearing plate through the vertical bearing on said rigid bearing plate, the axis of said shank being disposed at the intersection of a vertical plane passing through the horizontal axis of said steering wheel and a vertical plane passing through the center of the overall width of said steering wheel, a motor arranged with its shaft in vertical axial alignment with said carrier shank, means extending axially through said shank and operatively connected at its opposite ends with said motor shaft and said traction-steering wheel respectively, and means connected to said shank and extending within reach of an operator normally occupying said seat for turning the traction-steering wheel about its vertical axis for steering said car, the balancing of the occupant's weight reducing steering resistance between the said relatively movable bearing plates, and the alignment of the vertical and horizontal axes of said traction-steering wheel eliminating driving thrust resistance to the steering, whereby steering of the car under load is reduced to a minimum.

ROBERT J. LUSSE.